US008699587B2

(12) United States Patent
Blanz et al.

(10) Patent No.: US 8,699,587 B2
(45) Date of Patent: Apr. 15, 2014

(54) FEEDBACK OF PRECODING CONTROL INDICATION (PCI) AND CHANNEL QUALITY INDICATION (CQI) IN A WIRELESS COMMUNICATION SYSTEM

(75) Inventors: Josef J. Blanz, Wachenheim (DE); Ivan Jesus Fernandez-Corbaton, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 1115 days.

(21) Appl. No.: 11/841,549

(22) Filed: Aug. 20, 2007

(65) Prior Publication Data
US 2008/0043867 A1 Feb. 21, 2008

Related U.S. Application Data

(60) Provisional application No. 60/838,677, filed on Aug. 18, 2006.

(51) Int. Cl.
*H04L 27/28* (2006.01)
(52) U.S. Cl.
USPC ........... 375/260; 375/219; 375/267; 375/295; 375/316; 375/347; 455/69
(58) Field of Classification Search
CPC .. H04B 7/0632; H04B 7/0626; H04B 7/0634; H04B 7/0639; H04B 7/0645
USPC ................. 375/219, 260, 267, 295, 316, 347; 455/69, 455
See application file for complete search history.

(56) References Cited

U.S. PATENT DOCUMENTS

| 7,047,016 | B2 | 5/2006 | Walton et al. | |
| 7,466,666 | B2 * | 12/2008 | Yoon et al. | 370/278 |
| 7,688,899 | B2 | 3/2010 | Ketchum et al. | |
| 2006/0007889 | A1 * | 1/2006 | Khan | 370/331 |

(Continued)

FOREIGN PATENT DOCUMENTS

| CN | 1395375 A | 2/2003 |
| CN | 1773885 A | 5/2006 |

(Continued)

OTHER PUBLICATIONS

UMTS Physical layer procedures 3GPP TS 25.214 document (Dec. 2003).*

(Continued)

*Primary Examiner* — Sophia Vlahos
(74) *Attorney, Agent, or Firm* — Dalei Dong

(57) ABSTRACT

Techniques for sending feedback information in a wireless communication system are described. In one design, precoding control indication (PCI), rank, and channel quality indication (CQI) for data transmission from a transmitter to a receiver may be determined by evaluating different hypotheses. A report may be formed based on the PCI, rank and CQI. The PCI may include a precoding matrix or vector to use for the data transmission. The CQI may include at least one CQI value for at least one transport block to send for the data transmission. The rank and CQI may be combined based on a mapping. For example, the CQI may include one CQI value and fall within a first range of values if one transport block is preferred by the receiver. The CQI may include two CQI values and fall within a second range of values if two transport blocks are preferred.

55 Claims, 6 Drawing Sheets

(56) References Cited

U.S. PATENT DOCUMENTS

| | | | |
|---|---|---|---|
| 2006/0098568 A1 | 5/2006 | Oh et al. | |
| 2006/0109923 A1* | 5/2006 | Cai et al. | 375/260 |
| 2006/0133521 A1 | 6/2006 | Sampath et al. | |
| 2006/0223449 A1* | 10/2006 | Sampath et al. | 455/69 |
| 2007/0183380 A1* | 8/2007 | Rensburg et al. | 370/338 |
| 2007/0191066 A1* | 8/2007 | Khojastepour et al. | 455/562.1 |
| 2007/0223423 A1 | 9/2007 | Kim et al. | |
| 2008/0013610 A1* | 1/2008 | Varadarajan et al. | 375/221 |
| 2008/0069031 A1* | 3/2008 | Zhang et al. | 370/328 |

FOREIGN PATENT DOCUMENTS

| | | |
|---|---|---|
| EP | 1274178 | 1/2003 |
| EP | 1655871 | 5/2006 |
| EP | 1655874 | 5/2006 |
| JP | 2006141013 A | 6/2006 |
| JP | 2007505589 A | 3/2007 |
| JP | 2010502114 | 1/2010 |
| KR | 1020060042523 | 5/2006 |

OTHER PUBLICATIONS

LG Electronics "MIMO-OFDM Technology for Networking Engineers", Jun. 2006, pp. 1-32.*

International Search Report—PCT/US07/076076—International Search Authority, European Patent Office, Feb. 7, 2008.

Written Opinion—PCT/US07/076076—International Search Authority—European Patent Office, Munich—Feb. 7, 2008.

"Physical Channels and Mapping of Transport Channels onto Physical Channels (FDD)," 3GPP, TS 25.211 V7.0.0, Mar. 2006.

"Physical Layer Procedures (FDD)," 3GPP, TS 25.214 V7.1.0, Jun. 2006.

Cingular Wireless, Orange, 3, Telecom Italia, T-MObile, Vodafone Group, "Reference scenario for the evolution of the UTRA MIMO Scheme," 3GPP, TS RAN1, Tdoc R1-051626, Dec. 2005.

ETSI MCC, "Draft Report of the 32nd 3GPP TSG RAN meeting," (Warsaw, Poland May 31-Jun. 2, 2006), 3GPP TSG RAN email reflector, Jun. 2006.

Nokia, "MIMO scheme for consideration in UTRA MIMO evaluations," 3GPP TSG-RAN1, Tdoc R1-060281, Feb. 2006.

3GPP TSG RAN 1, "LS on Rel-7 MIMO Conclusions," 3GPP TSG RAN1 Tdoc RP-060343, May 2006.

Motorola, "MIMO Evaluation Proposal," 3GPP, TSG RAN1, Tdoc R1-060615, Feb. 2006.

Nokia. "D-TxAA, PARC, and Single Antenna Systems in Urban Microcells." 3GPP, TSG Rant. Tdoc. R1-061119. May 2006.

Motorola, "D-TxAA, PARC, and Single Antenna Systems in Urban Microcells," 3GPP, TSG RAN1, Tdoc, R1-061206, May 2006.

Qualcomm Europe, "Cell and User Throughput Comparison for 2x2 MIMO: D-TxAA and PARC," 3GPP, TSG RAN1, Tdoc R1-061491, May 2006.

* cited by examiner

FEEDBACK OF PRECODING CONTROL INDICATION (PCI) AND CHANNEL QUALITY INDICATION (CQI) IN A WIRELESS COMMUNICATION SYSTEM

CLAIM OF PRIORITY UNDER 35 U.S.C. §119

The present Application for Patent claims priority to Provisional Application Ser. No. 60/838,677, entitled "Joint Signaling of Precoding Control Information and Channel Quality Indicators in a Cellular MIMO System," filed Aug. 18, 2006, assigned to the assignee hereof, and expressly incorporated herein by reference.

BACKGROUND

I. Field

The present disclosure relates generally to communication, and more specifically to techniques for sending feedback information in a wireless communication system.

II. Background

In a wireless communication system, a transmitter may utilize multiple (T) transmit antennas for data transmission to a receiver equipped with multiple (R) receive antennas. The multiple transmit and receive antennas form a multiple-input multiple-output (MIMO) channel that may be used to increase throughput and/or improve reliability. For example, the transmitter may transmit up to T data streams simultaneously from the T transmit antennas to improve throughput. Alternatively, the transmitter may transmit a single data stream from all T transmit antennas to improve reception by the receiver. Each data stream may carry one transport block or packet of data in a given transmission time interval (TTI). Hence, the terms "data stream" and "transport block" may be used interchangeably.

Good performance (e.g., high throughput) may be achieved by precoding one or more data streams with a precoding matrix selected based on the response of the MIMO channel from the transmitter to the receiver. Precoding may also be referred to as beamforming, spatial mapping, etc. The receiver may evaluate different possible precoding matrices and select a precoding matrix as well as the number of data streams to send such that the best performance can be achieved. The receiver may also determine a signal-to-interference-and-noise ratio (SINR) for each possible data stream and select a data rate for the data stream based on the SINR. The receiver may send feedback information that may include the selected precoding matrix, the data rate for each data stream, etc. The transmitter may process one or more data streams in accordance with the feedback information and send the data stream(s) to the receiver.

The feedback information may improve data transmission performance. However, valuable radio resources are consumed to send the feedback information. There is therefore a need in the art for techniques to efficiently send the feedback information.

SUMMARY

Techniques for efficiently sending feedback information in a wireless communication system are described herein. The feedback information may comprise precoding control indication (PCI), rank, channel quality indication (CQI), etc., or any combination thereof.

In one design of sending feedback information, PCI, rank and CQI for data transmission from a transmitter to a receiver may be determined, e.g., by evaluating different hypotheses and selecting the PCI, rank and CQI of the hypothesis with the best performance. A report may be formed based on the selected PCI, rank and CQI. The rank may indicate the number of transport blocks to send in parallel for the data transmission. The PCI may comprise a precoding matrix or vector to use for precoding at least one transport block to send for the data transmission. The CQI may comprise at least one CQI value for the at least one transport block. Each CQI value may be associated with parameters for processing a transport block, e.g., transport block size, coding and modulation scheme, number of channelization codes, etc. The rank and CQI may be combined based on a mapping. For example, the CQI may comprise one CQI value and fall within a first range of values (e.g., from 0 to 30) if one transport block is preferred by the receiver. The CQI may comprise two CQI values and fall within a second range of values (e.g., from 31 to 255) if two transport blocks are preferred.

In one design of sending data transmission, a report comprising PCI, rank and CQI may be received by a transmitter. The number of transport blocks to send for the data transmission may be determined based on one of multiple ranges of values within which the CQI falls. At least one transport block may be processed (e.g., encoded and modulated) based on at least one CQI value from the CQI and may be further precoded based on a precoding matrix or vector from the PCI.

Various aspects and features of the disclosure are described in further detail below.

DETAILED DESCRIPTION

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The terms "system" and "network" are often used interchangeably. A CDMA system may implement a radio technology such Universal Terrestrial Radio Access (UTRA), cdma2000, etc. UTRA includes Wideband-CDMA (which covers W-CDMA, UMTS-FDD) and Time Division Synchronous CDMA (TD-SCDMA) (which covers UMTS-TDD, low chip rate UMTS-TDD, and high chip rate UMTS-TDD). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), Flash-OFDM®, etc. UTRA and E-UTRA are part of Universal Mobile Telecommunication System (UMTS). Long Term Evolution (LTE) is an upcoming release of UMTS that utilizes E-UTRA. UTRA, E-UTRA, UMTS, LTE and GSM are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for UMTS, and 3GPP terminology is used in much of the description below.

Figure 1:
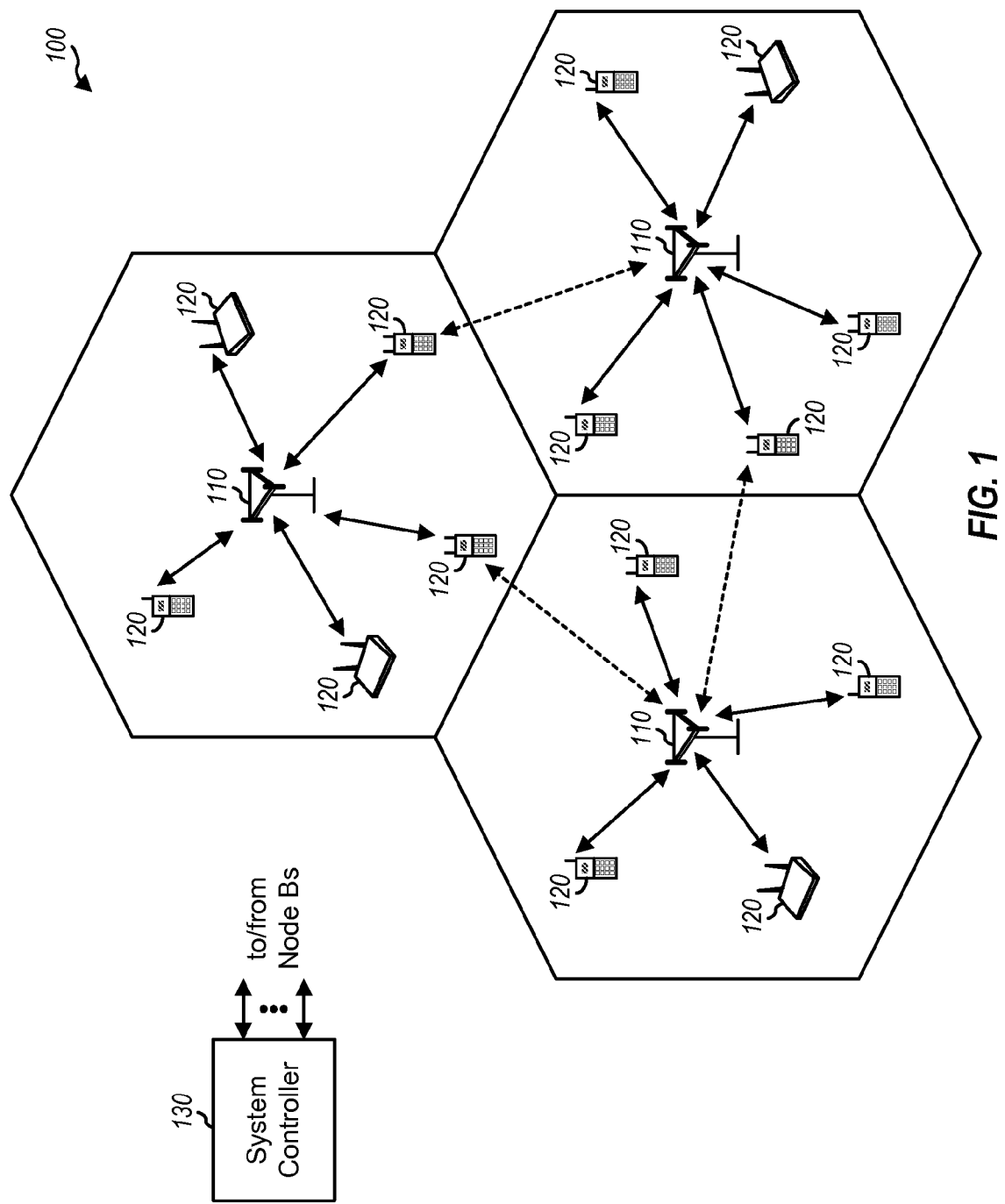
FIG. 1 shows a wireless communication system.

FIG. 1 shows a wireless communication system 100 with multiple Node Bs 110 and user equipments (UEs) 120. System 100 may also be referred to as a Universal Terrestrial Radio Access Network (UTRAN) in 3GPP. A Node B is generally a fixed station that communicates with the UEs and may also be referred to as an evolved Node B (eNode B), a base station, an access point, etc. Each Node B 110 provides communication coverage for a particular geographic area and supports communication for the UEs located within the coverage area. A system controller 130 couples to Node Bs 110 and provides coordination and control for these Node Bs. System controller 130 may be a single network entity or a collection of network entities.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless device, a handheld device, a wireless modem, a laptop computer, etc.

Figure 2:
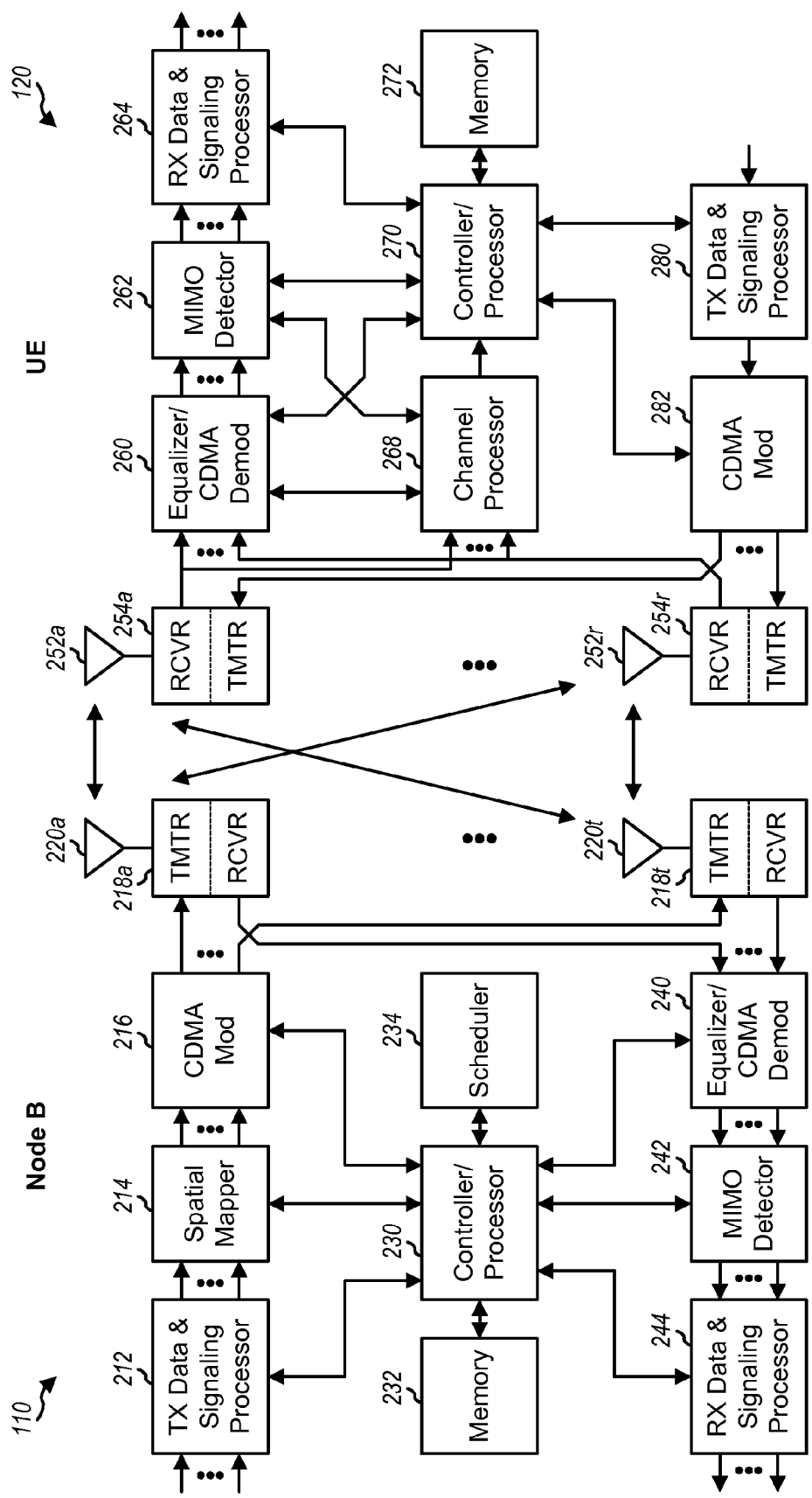
FIG. 2 shows a block diagram of a Node B and a UE.

FIG. 2 shows a block diagram of a design of one Node B 110 and one UE 120.

Node B 110 is equipped with multiple (T) antennas 220a through 220t that may be used for data transmission on the downlink and data reception on the uplink. UE 120 is equipped with multiple (R) antennas 252a through 252r that may be used for data transmission on the uplink and data reception on the downlink. Each antenna may be a physical antenna, a virtual antenna comprising an antenna array and an appropriate beamforming device, an antenna array with a fixed weighting network, etc. A MIMO transmission may be sent from the T transmit antennas at Node B 110 to the R receive antennas at UE 120.

At Node B 110, a transmit (TX) data and signaling processor 212 may receive data from a data source (not shown) for all scheduled UEs. Processor 212 may process (e.g., format, encode, interleave, and symbol map) the data for each UE and provide data symbols, which are modulation symbols for data. Processor 212 may also process signaling and provides signaling symbols, which are modulation symbols for signaling. A spatial mapper 214 may precode the data symbols for each UE based on a precoding matrix or vector selected by/for that UE and provide output symbols. In general, a matrix may have a single column or multiple columns. A CDMA modulator (Mod) 216 may perform CDMA processing on the output symbols and signaling symbols and may provide T output chip streams to T transmitters (TMTR) 218a through 218t. Each transmitter 218 may process (e.g., convert to analog, filter, amplify, and frequency upconvert) its output chip stream and generate a downlink signal. T downlink signals from T transmitters 218a through 218t may be sent via T antennas 220a through 220t, respectively.

At UE 120, R antennas 252a through 252r may receive the downlink signals from Node B 110 and provide R received signals to R receivers (RCVR) 254a through 254r, respectively. Each receiver 254 may process (e.g., filter, amplify, frequency downconvert, and digitize) its received signal and provide samples to a channel processor 268 and an equalizer/CDMA demodulator (Demod) 260. Processor 268 may derive coefficients for a front-end filter/equalizer and coefficients for one or more combiner matrices. Unit 260 may perform equalization with the front-end filter and CDMA demodulation and may provide filtered symbols. A MIMO detector 262 may combine the filtered symbols across spatial dimension and provide detected symbols, which are estimates of the data symbols and signaling symbols sent to UE 120. A receive (RX) data processor 264 may process (e.g., symbol demap, deinterleave, and decode) the detected symbols and provide decoded data and signaling. In general, the processing by equalizer/CDMA demodulator 260, MIMO detector 262, and RX data processor 264 is complementary to the processing by CDMA modulator 216, spatial mapper 214, and TX data and signaling processor 212, respectively, at Node B 110.

Channel processor 268 may estimate the response of the wireless channel from Node B 110 to UE 120. Processor 268 and/or 270 may process the channel estimate to obtain feedback information, which may comprise the information shown in Table 1.

TABLE 1

| Info | Description |
|---|---|
| PCI | Convey a specific precoding matrix or vector to use for precoding one or more transport blocks. |
| Rank | Indicate the number of transport blocks to send in parallel. |
| CQI | Convey processing parameters for each transport block. |

Processor 268 and/or 270 may jointly determine the PCI, rank and CQI for downlink data transmission based on the channel estimate. For example, processor 268 and/or 270 may evaluate different possible precoding matrices that can be used for data transmission and different combinations of columns in each precoding matrix. Each column of a precoding matrix may be used for precoding/spatial mapping to send one transport block from all T antennas 220a through 220t. Processor 268 and/or 270 may select a precoding matrix as well as one or more specific columns of the selected precoding matrix that can provide the best performance. Performance may be quantified by throughput and/or some other metric. The PCI may convey the selected precoding matrix, the selected column(s) of the selected precoding matrix, etc. The CQI may convey the coding and modulation scheme to use for each transport block, the data rate or transport format for each transport block, the SINR of each transport block, etc. Processor 268 and/or 270 may provide feedback information, which may include the PCI, rank and CQI.

The feedback information and data to send on the uplink may be processed by a TX data and signaling processor 280, further processed by a CDMA modulator 282, and conditioned by transmitters 254a through 254r to generate R uplink signals, which may be transmitted via antennas 252a through 252r, respectively. The number of transmit antennas at UE 120 may be the same as or different from the number of receive antennas, e.g., UE 120 may transmit the feedback information using one antenna and receive data using two antennas. At Node B 110, the uplink signals from UE 120 may be received by antennas 220a through 220t, conditioned by receivers 218a through 218t, filtered by an equalizer/CDMA demodulator 240, detected by a MIMO detector 242, and processed by an RX data and signaling processor 244 to recover the feedback information and data sent by UE 120.

Controllers/processors 230 and 270 may direct the operation at Node B 110 and UE 120, respectively. Memories 232 and 272 may store program codes and data for Node B 110 and UE 120, respectively. A scheduler 234 may schedule UEs for downlink and/or uplink transmission, e.g., based on the feedback information received from the UEs.

In UMTS, data for a UE may be processed as one or more transport channels at a higher layer. The transport channels may carry data for one or more services, e.g., voice, video, packet data, etc. The transport channels may be mapped to physical channels at a physical layer. The physical channels may be channelized with different channelization codes and may thus be orthogonal to one another in the code domain.

3GPP Release 5 and later supports High-Speed Downlink Packet Access (HSDPA), which is a set of channels and procedures that enable high-speed packet data transmission on the downlink. For HSDPA, a Node B may send data on a High Speed Downlink Shared Channel (HS-DSCH), which is a downlink transport channel that is shared by all UEs in both time and code. The HS-DSCH may carry data for one or more UEs in each TTI. For HSDPA, a 10 millisecond (ms) frame is partitioned into five 2-ms subframes, each subframe includes three slots, and each slot has a duration of 0.667 ms. A TTI is equal to one subframe for HSDPA and is the smallest unit of time in which a UE may be scheduled and served. The sharing of the HS-DSCH may be dynamic and may change from TTI to TTI.

Table 2 lists some downlink and uplink physical channels in UMTS and provides a short description for each physical channel.

TABLE 2

| Link | Channel | Channel Name | Description |
| --- | --- | --- | --- |
| Downlink | HS-PDSCH | High Speed Physical Downlink Shared Channel | Carry data sent on the HS-DSCH for different UEs. |
| Downlink | HS-SCCH | Shared Control Channel for HS-DSCH | Carry signaling for the HS-PDSCH. |
| Uplink | HS-DPCCH | Dedicated Physical Control Channel for HS-DSCH | Carry feedback for downlink transmission in HSDPA. |
| Uplink | DPDCH | Dedicated Physical Data Channel | Carry data sent by a UE to a Node B on the uplink. |
| Uplink | DPCCH | Dedicated Physical Control Channel | Carry control information sent by the UE to the Node B. |

Figure 3:
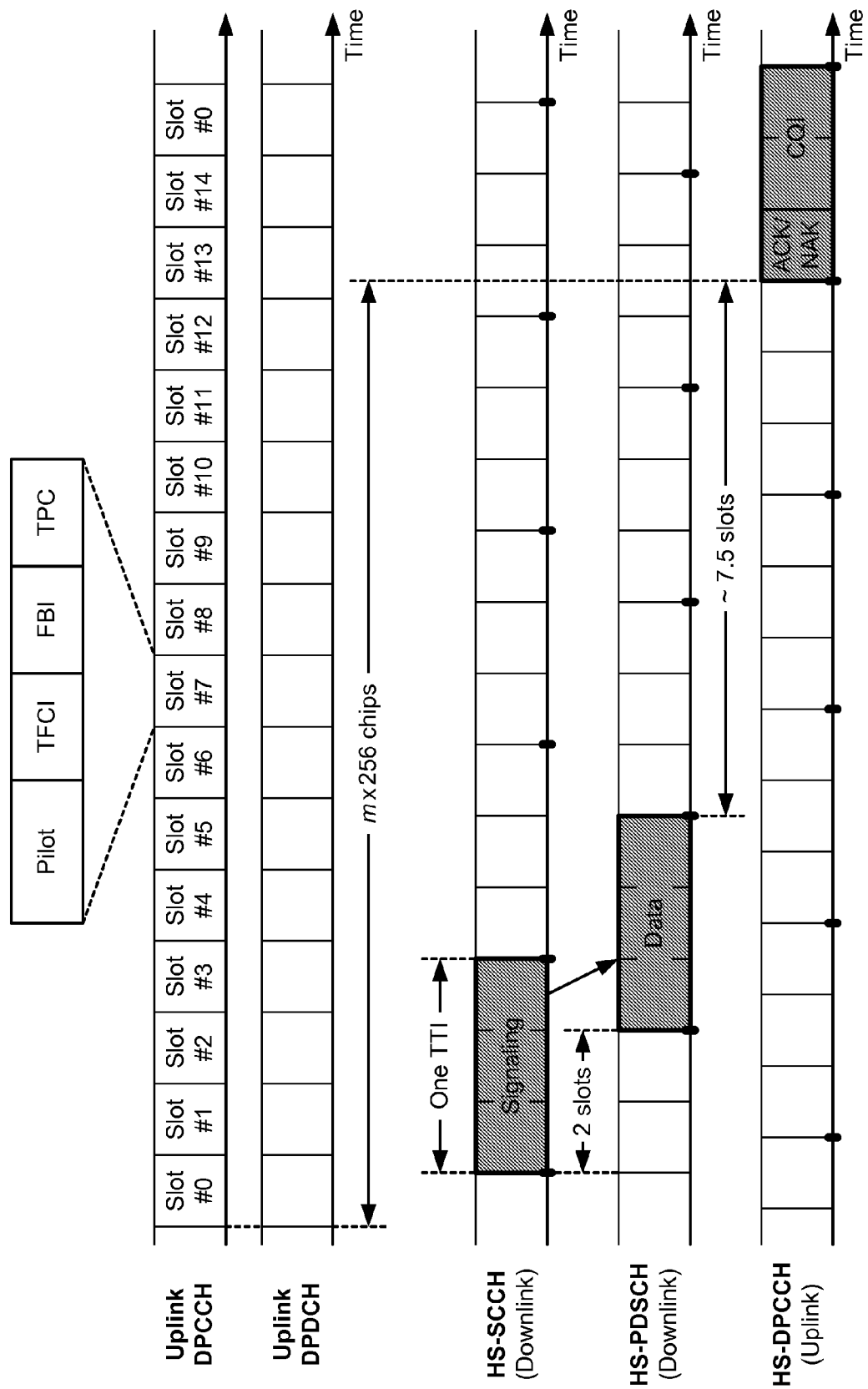
FIG. 3 shows a timing diagram for a set of physical channels.

FIG. 3 shows a timing diagram for the physical channels in Table 2. For HSDPA, a Node B may serve one or more UEs in each TTI. The Node B sends signaling for each scheduled UE on the HS-SCCH and sends data on the HS-PDSCH two slots later. The Node B may use a configurable number of 128-chip channelization codes for the HS-SCCH and may use up to fifteen 16-chip channelization codes for the HS-PDSCH(s). Each UE that might receive data on the HS-PDSCH may process a number of HS-SCCH(s) in each TTI to determine whether signaling has been sent for that UE. Each UE that is scheduled in a given TTI may process the HS-PDSCH to recover data sent to that UE. Each scheduled UE may send either an acknowledgement (ACK) on the HS-DPCCH if a transport block is decoded correctly or a negative acknowledgement (NACK) otherwise. Each UE may also send feedback information to the Node B on the HS-DPCCH and/or uplink DPCCH, as described below.

FIG. 3 also shows timing offsets between the uplink DPCCH, the HS-PDSCH, and the HS-DPCCH at the UE. The HS-PDSCH starts two slots after the HS-SCCH. The HS-DPCCH starts approximately 7.5 slots from the end of the corresponding transmission on the HS-PDSCH and also m×256 chips after the start of a corresponding uplink DPCH subframe. The HS-DPCCH may be asynchronous to the uplink DPCCH but is aligned to a 256-chip raster so that the uplink transmit signals on different code channels remain orthogonal.

Node B 110 may perform precoding/spatial mapping for each HS-PDSCH channelization code c in each symbol period s, as follows:

$$d_c(s) = B_c b_c(s), \quad \text{Eq (1)}$$

where $b_c(s)$ is a vector with up to T data symbols to send with channelization code c in symbol period s, $B_c$ is a precoding matrix or vector for channelization code c, and $d_c(s)$ is a vector with T output symbols to send with channelization code c in symbol period s via the T transmit antennas.

Various precoding/spatial mapping schemes may be supported such as double-transmit adaptive array (D-TxAA), space-time transmit diversity (STTD), closed loop transmit diversity (CLTD), per antenna rate control (PARC), code reuse Bell Labs layered space-time (CRBLAST), etc. For D-TxAA, one transport block may be sent from two antennas using a 2×1 precoding vector, or two transport blocks may be sent from two antennas using a 2×2 precoding matrix. For STTD, one transport block may be sent from two antennas, with each data symbol being sent from both antennas in two symbol periods to achieve time and spatial diversity. For CLTD, one transport block may be sent from two transmit antennas, with the phase of one antenna being adjusted to improve reception by the UE. For PARC, up to T transport blocks may be sent from up to T transmit antennas, one transport block per antenna. For CRBLAST, one transport block may be sent from up to T transmit antennas. For both PARC and CRBLAST, precoding matrix $B_c$ may be an identity matrix I containing ones along the diagonal and zeros elsewhere. Other spatial mapping schemes may also be supported. For clarity, the following description assumes the use of D-TxAA, and feedback information is generated and sent for D-TxAA.

In general, any number of precoding matrices may be supported for D-TxAA. In one design, two precoding matrices are supported and defined as follows:

$$W_1 = \frac{1}{\sqrt{2}} \cdot \begin{bmatrix} 1 & 1 \\ e^{j\pi/4} & e^{j5\pi/4} \end{bmatrix} \quad \text{Eq (2)}$$

and $$W_2 = \frac{1}{\sqrt{2}} \cdot \begin{bmatrix} 1 & 1 \\ e^{j3\pi/4} & e^{j7\pi/4} \end{bmatrix}.$$

The two columns of each precoding matrix are orthogonal to one another, and each column has unit power.

Four precoding vectors may be defined based on precoding matrices $W_1$ and $W_2$ and may be given as:

$$w_0 = a \cdot \begin{bmatrix} 1 \\ e^{j\pi/4} \end{bmatrix}, w_1 = a \cdot \begin{bmatrix} 1 \\ e^{-j\pi/4} \end{bmatrix}, \qquad \text{Eq (3)}$$

$$w_2 = a \cdot \begin{bmatrix} 1 \\ e^{j3\pi/4} \end{bmatrix} \text{ and } w_3 = a \cdot \begin{bmatrix} 1 \\ e^{-j3\pi/4} \end{bmatrix},$$

where $w_0$ and $w_3$ are precoding vectors corresponding to the first and second columns, respectively, of precoding matrix $W_1$, or $W_1=[w_0\ w_3]$, $w_1$ and $w_2$ are precoding vectors corresponding to the second and first columns, respectively, of precoding matrix $W_2$, or $W_2=[w_2\ w_1]$, and $\alpha=1/\sqrt{2}$.

Since the first element of each precoding vector has a common value of $\alpha=1/\sqrt{2}$, the four precoding vectors in equation (3) may be defined based on the values of the second element, which may be given as:

$$w_0 = \frac{1+j}{2}, w_1 = \frac{1-j}{2}, w_2 = \frac{-1+j}{2} \text{ and } w_3 = \frac{-1-j}{2}, \qquad \text{Eq (4)}$$

where $w_0$, $w_1$, $w_2$ and $w_3$ are the second element of precoding vectors $w_0$, $w_1$, $w_2$ and $w_3$, respectively.

The UE may periodically determine the precoding matrix or vector that can provide the best performance for downlink data transmission to the UE. For example, in each TTI, the UE may estimate the response of the wireless channel from the Node B to the UE. The UE may then evaluate the performance of different hypotheses corresponding to different possible precoding matrices and vectors. For example, the UE may determine the overall throughput for transmission of (1) two transport blocks using $W_1$, (2) two transport blocks using $W_2$, (3) one transport block using $w_0$, (4) one transport block using $w_1$, (5) one transport block using $w_2$, (6) one transport block using $w_3$, etc. As part of the throughput computation for each hypothesis, the UE may determine the SINR of each transport block based on the precoding matrix or vector for that hypothesis.

The UE may support successive interference cancellation (SIC) and may recover multiple transport blocks using SIC. For SIC, the UE may process the received samples to recover a first (or master) transport block, estimate the interference due to the recovered transport block, subtract the estimated interference from the received samples, and recover a second transport block in the same manner. The first transport block observes interference from the second transport block and may thus achieve lower SINR. The second transport block may observe little interference from the first transport block, if the interference cancellation was effective, and may achieve higher SINR.

If the UE supports SIC, then the UE may determine overall throughput for transmission of two transport blocks using $W_1$ with (i) the transport block sent with the first column of $W_1$ recovered first and (ii) the transport block sent with the second column of $W_1$ recovered first. The UE may also determine overall throughput for transmission of two transport blocks using $W_2$ with (i) the transport block sent with the first column of $W_2$ recovered first and (ii) the transport block sent with the second column of $W_2$ recovered first.

The UE may select the precoding matrix or vector that can provide the best performance among all hypotheses evaluated. The UE may then determine PCI, which may convey the selected precoding matrix or vector. The UE may determine the rank for the best hypothesis, which may indicate the number of transport blocks to send in parallel. The UE may also determine a CQI value for each transport block, which may convey processing parameters for the transport block. The UE may send the PCI, rank and CQI as feedback information to the Node B.

In one design, the PCI conveys the selected precoding matrix and may be sent with one PCI bit defined as shown in Table 3.

TABLE 3

| PCI value | Selected precoding matrix |
|---|---|
| 0 | $W_1$ |
| 1 | $W_2$ |

In another design, the PCI conveys the selected precoding matrix and which column of the selected precoding matrix to use if sending one transport block. In this design, the PCI and rank may be sent with three PCI bits defined as shown in Table 4.

TABLE 4

| PCI value | Selected precoding matrix | Number of transport blocks | Selected column for single transport block |
|---|---|---|---|
| 0 | $W_1$ | 1 | 1 (or $w_0$) |
| 1 | $W_1$ | 1 | 2 (or $w_3$) |
| 2 | $W_2$ | 1 | 1 (or $w_2$) |
| 3 | $W_2$ | 1 | 2 (or $w_1$) |
| 4 | $W_1$ | 2 | N/A |
| 5 | $W_2$ | 2 | N/A |

In yet another design, the PCI conveys the selected precoding matrix, which column of the selected precoding matrix to use if sending one transport block, and which transport block will be decoded first (which is called the master transport block) if the UE supports SIC. In this design, the PCI and rank may be sent with three PCI bits defined as shown in Table 5. PCI values 011 and 111 may be used by SIC-capable UEs.

TABLE 5

| PCI value | | | Selected precoding matrix | Number of transport blocks | Selected column for single transport block | Index of master transport block for SIC capable UE |
|---|---|---|---|---|---|---|
| $PCI_2$ | $PCI_1$ | $PCI_0$ | | | | |
| 0 | 0 | 0 | $W_1$ | 1 | 1 | N/A |
| 0 | 0 | 1 | $W_1$ | 2 | N/A | 1 |
| 0 | 1 | 0 | $W_1$ | 1 | 2 | N/A |
| 0 | 1 | 1 | $W_1$ | 2 | N/A | 2 |
| 1 | 0 | 0 | $W_2$ | 1 | 1 | N/A |
| 1 | 0 | 1 | $W_2$ | 2 | N/A | 1 |
| 1 | 1 | 0 | $W_2$ | 1 | 2 | N/A |
| 1 | 1 | 1 | $W_2$ | 2 | N/A | 2 |

In general, the PCI may comprise any information that can convey a specific precoding matrix or vector to use for data transmission. In the designs described above, the PCI may convey the selected preceding matrix and the selected column of this matrix if only one transport block is sent. In another design, the PCI may convey one or more specific precoding vectors to use for one or more transport blocks, and additional precoding vectors to use for additional transport blocks, if any, may be determined based on the signaled precoding vector(s). For example, in the design shown in equations (2) and (3), the PCI may convey a specific preceding vector to use for one transport block. If two transport blocks are selected or preferred by the UE, then the precoding vector to use for the second transport block may be the complement of the signaled precoding vector, with both vectors being from the same precoding matrix. For example, a 2-bit PCI value may convey precoding vector $w_1$ for one transport block. If two transport block are selected or preferred, then the complementary precoding vector $w_2$ may be used for the second transport block, with both $w_1$ and $w_2$ being from $W_2$. In general, the number of bits to use for the PCI may be reduced by exploiting the structure of the precoding matrices, so that some precoding information may be sent explicitly while other precoding information may be sent implicitly or inferred from the signaled precoding information.

The PCI may also include other information such as information on the UE capabilities. The UE may convey its capabilities, such as the specific UE MIMO receiver architecture, to the UTRAN during call setup. For example, a flag in the UE capabilities may be set to indicate that the UE supports SIC. The Node B scheduler may use the information on the UE capabilities to schedule UEs for transmission and to allocate resources to the scheduled UEs. As an example, the Node B scheduler may allocate the same code resources to a given UE for both transport blocks, and the UE may effectively perform interference cancellation for the second transport block if the UE supports SIC. If the Node B scheduler knows which of the two transport blocks will be recovered first and potentially cancelled from the received signals before recovering the second transport block, then the scheduler may choose to mix two UEs in a Spatial Division Multiple Access (SDMA) manner by using only the PCI and CQI for the transport block that will be recovered first. The transport block that would be decoded first in case of a SIC-capable UE is the one for which the preferred primary precoding vector and the associated CQI are signaled. The Node B scheduler may use only the information in the PCI/CQI reports for the preferred primary transport blocks from different UEs for SDMA if the Node B scheduler wants to schedule a transport block of one UE in parallel with a transport block for another UE.

The UE may send CQI for one or more transport blocks, and the Node B may process each transport block based on the CQI sent by the UE. The CQI may be provided in various manners.

In one design, a CQI value may be provided for each transport block and may be used to process the transport block at the Node B. In this design, one CQI value may be provided if one transport block is preferred by the UE, and two CQI values may be provided if two transport blocks are preferred. The one or two CQI values may be sent with the associated PCI in the same TTI. Alternatively, two CQI values for two transport blocks may be sent in a time division multiplexed (TDM) manner over two TTIs, one CQI value in each TTI. The PCI that is associated with the set of TDMed CQI values together with these CQI values form one PCI/CQI report at a lower rate than without time division multiplexing. Each CQI value may have a sufficient number of bits of resolution to achieve the desired granularity. The same granularity may be used for each CQI value. Alternatively, different granularities may be used for the CQI values for different numbers of transport blocks. For example, a 5-bit CQI value may be provided for one transport block, and two 4-bit CQI values may be provided for two transport blocks. Computer simulation indicates a negligible loss of 0 to 2 percents in sector throughput when using 4-bit CQI values instead of 5-bit CQI values for two transport blocks.

The CQI may be combined with the PCI and/or rank. Different amounts of CQI information may be sent depending on whether one or two transport blocks are preferred by the UE. By combining the CQI with the PCI and/or rank, fewer total number of bits may be needed for the feedback information. Furthermore, this combining of PCI, rank and CQI may have the advantage that all the information on the associated PCI, rank and CQI that the Node B scheduler uses to effectively allocate resources to UEs are available simultaneously. If these components of the feedback are received at different times and/or at different update rates, then the Node B scheduler may lack information that would be needed for good scheduling. For instance, it may not be helpful if the Node B scheduler obtains an update of the PCI and rank but does not know the supported transport block sizes for this particular PCI and rank combination.

In one design, the PCI, rank and CQI are combined into a single PCI/CQI report, which may also be referred to as composite PCI and CQI bits. Table 6 shows a design of a 10-bit PCI/CQI report for the PCI given in Table 5. In this design, the most significant bit (MSB) is a precoding matrix (PM) selector bit that indicates which precoding matrix is selected. The PM bit is equal to '0' when $W_1$ is selected and equal to '1' when $W_2$ is selected. The PM bit is equal to the $PCI_2$ bit in Table 5. The next MSB is a column index (CI) bit that indicates (i) which column of the selected precoding matrix to use when a single transport block is preferred or (ii) which transport block is the master transport block when two transport blocks are preferred. The CI bit is equal to the $PCI_1$ bit in Table 5. The remaining eight bits convey the CQI for one or two transport blocks. There are 256 possible values for each PM and CI combination, with the first 32 values being used to convey one CQI value for one transport block, and the remaining 224 values being used to convey two CQI values for two transport blocks. A logical OR of the third through fifth MSBs is equal to '0' for one transport block and equal to '1' for two transport blocks, and is thus equal to the $PCI_0$ bit in Table 5.

TABLE 6

| Index | PM | CI | CQI Values | | | | | | | | Used For |
|---|---|---|---|---|---|---|---|---|---|---|---|
| 0 | 0 | 0 | 0 | 0 | 0 | 0 | 0 | 0 | 0 | 0 | 32 CQI levels for single |
| 1 | 0 | 0 | 0 | 0 | 0 | 0 | 0 | 0 | 0 | 1 | transport block with |
| | | | | | | . | | | | | column #1 of precoding |
| | | | | | | . | | | | | matrix #1 |
| 31 | 0 | 0 | 0 | 0 | 0 | 0 | 1 | 1 | 1 | 1 | |
| 32 | 0 | 0 | 0 | 0 | 1 | 0 | 0 | 0 | 0 | 0 | 224 CQI combinations for |
| 33 | 0 | 0 | 0 | 0 | 1 | 0 | 0 | 0 | 0 | 1 | two transport blocks with |
| | | | | | | . | | | | | precoding matrix #1 and |
| | | | | | | . | | | | | master #1 |

TABLE 6-continued

| Index | PM | CI | | | CQI Values | | | | | | Used For |
|---|---|---|---|---|---|---|---|---|---|---|---|
| 255 | 0 | 0 | 1 | 1 | 1 | 1 | 1 | 1 | 1 | 1 | |
| 256 | 0 | 1 | 0 | 0 | 0 | 0 | 0 | 0 | 0 | 0 | 32 CQI levels for single |
| 257 | 0 | 1 | 0 | 0 | 0 | 0 | 0 | 0 | 0 | 1 | transport block with |
| . | | | | | | | | | | | column #2 of precoding |
| . | | | | | | | | | | | matrix #1 |
| . | | | | | | | | | | | |
| 287 | 0 | 1 | 0 | 0 | 0 | 1 | 1 | 1 | 1 | 1 | |
| 288 | 0 | 1 | 0 | 0 | 1 | 0 | 0 | 0 | 0 | 0 | 224 CQI combinations for |
| 289 | 0 | 1 | 0 | 0 | 1 | 0 | 0 | 0 | 0 | 1 | two transport blocks with |
| . | | | | | | | | | | | precoding matrix #1 and |
| . | | | | | | | | | | | master #2 |
| . | | | | | | | | | | | |
| 511 | 0 | | 1 | 1 | 1 | 1 | 1 | 1 | 1 | 1 | |
| 512 | 1 | 0 | 0 | 0 | 0 | 0 | 0 | 0 | 0 | 0 | 32 CQI levels for single |
| 513 | 1 | 0 | 0 | 0 | 0 | 0 | 0 | 0 | 0 | 1 | transport block with |
| . | | | | | | | | | | | column #1 of precoding |
| . | | | | | | | | | | | matrix #2 |
| . | | | | | | | | | | | |
| 543 | 1 | 0 | 0 | 0 | 0 | 1 | 1 | 1 | 1 | 1 | |
| 544 | 1 | 0 | 0 | 0 | 1 | 0 | 0 | 0 | 0 | 0 | 224 CQI combinations for |
| 545 | 1 | 0 | 0 | 0 | 1 | 0 | 0 | 0 | 0 | 1 | two transport blocks with |
| . | | | | | | | | | | | precoding matrix #2 and |
| . | | | | | | | | | | | master #1 |
| . | | | | | | | | | | | |
| 767 | 1 | 0 | 1 | 1 | 1 | 1 | 1 | 1 | 1 | 1 | |
| 768 | 1 | 1 | 0 | 0 | 0 | 0 | 0 | 0 | 0 | 0 | 32 CQI levels for single |
| 769 | 1 | 1 | 0 | 0 | 0 | 0 | 0 | 0 | 0 | 1 | transport block with |
| . | | | | | | | | | | | column #2 of precoding |
| . | | | | | | | | | | | matrix #2 |
| . | | | | | | | | | | | |
| 799 | 1 | 1 | 0 | 0 | 0 | 1 | 1 | 1 | 1 | 1 | |
| 800 | 1 | 1 | 0 | 0 | 1 | 0 | 0 | 0 | 0 | 0 | 224 CQI combinations for |
| 801 | 1 | 1 | 0 | 0 | 1 | 0 | 0 | 0 | 0 | 1 | two transport blocks with |
| . | | | | | | | | | | | precoding matrix #2 and |
| . | | | | | | | | | | | master #2 |
| . | | | | | | | | | | | |
| 1023 | 1 | 1 | 1 | 1 | 1 | 1 | 1 | 1 | 1 | 1 | |

In the design shown in Table 6, the two MSBs of the PCI/CQI report convey the PCI, and the eight least significant bits (LSBs) of the PCI/CQI report convey the rank and CQI. An 8-bit composite value for the LSB portion of the PCI/CQI report has an overall range of 0 to 255. The lower range of 0 to 31 is used for one transport block (or rank=1), and the upper range of 32 to 255 is used for two transport blocks (or rank=2). One 5-bit CQI value may be sent when one transport block is preferred by the UE, and two 4-bit CQI values may be sent when two transport blocks are preferred. Since the upper range has only 224 possible values for two 4-bit CQI values, 32 out of 256 possible CQI combinations are not supported. The 32 CQI combinations that are least likely to occur may be eliminated.

Figure 4:
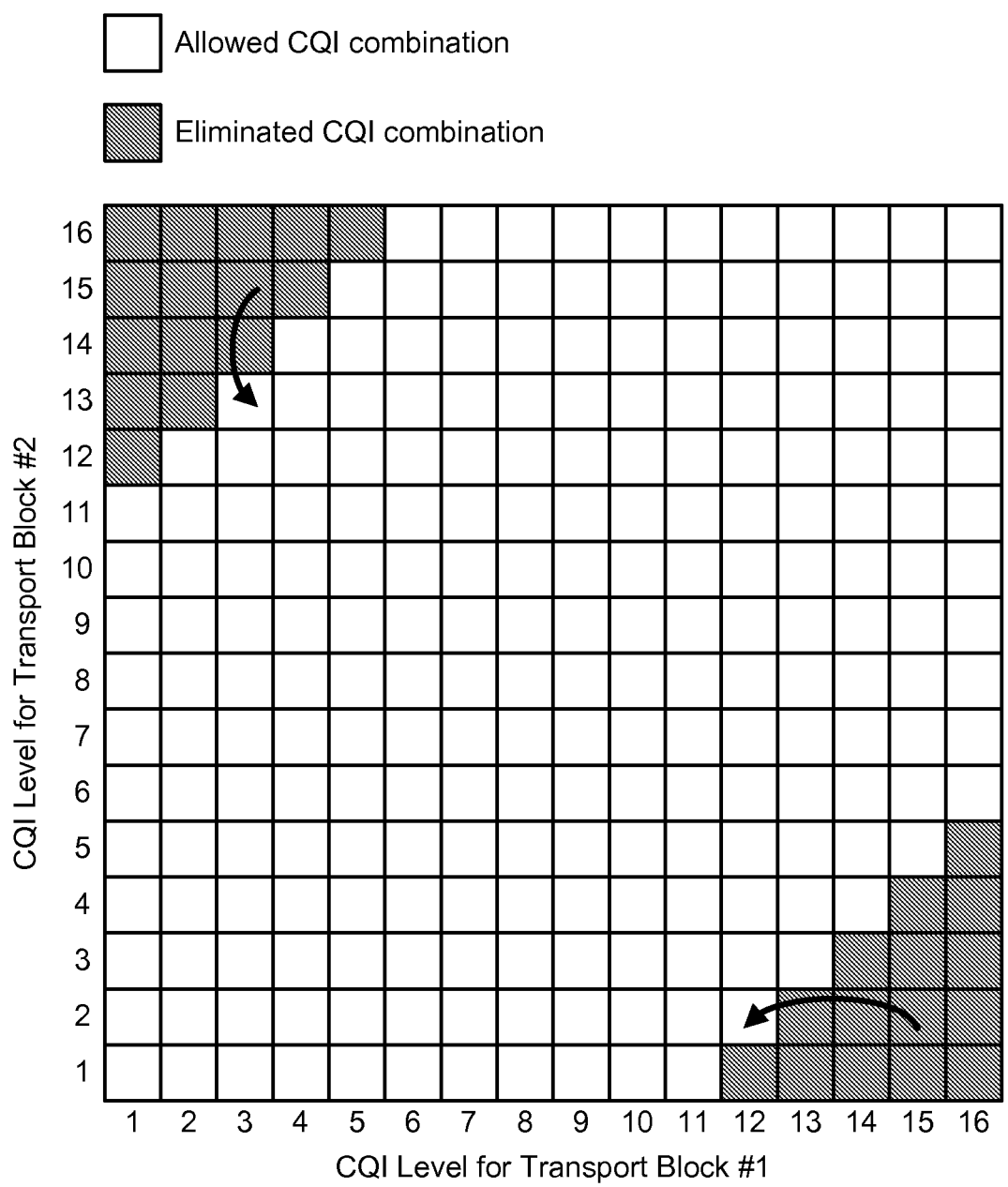
FIG. 4 shows a design of mapping two CQI values to a CQI combination.

FIG. 4 shows a design of eliminating 32 CQI combinations for two 4-bit CQI values. The horizontal axis shows the 16 possible CQI levels for transport block #1, and the vertical axis shows the 16 possible CQI levels for transport block #2. When two transport blocks are preferred by the UE, the channel qualities of the two transport blocks are normally not totally uncorrelated. Hence, it may be unlikely to have CQI combinations with extreme asymmetry for the two transport blocks, e.g., very low CQI level for one transport block and very high CQI level for the other transport block. FIG. 4 shows 32 asymmetric CQI combinations with shading that may be eliminated.

If the measured CQI values for the two transport blocks map to one of the eliminated CQI combinations, then the larger of the two CQI values may be reduced until the resultant CQI values map to an allowed CQI combination. In the example shown in FIG. 4, if the measured CQI values map to one of the eliminated CQI combinations in the upper left corner, then the CQI value of transport block #2 may be reduced until an allowed CQI combination is obtained. If the measured CQI values map to one of the eliminated CQI combinations in the lower right corner, then the CQI value of transport block #1 may be reduced until an allowed CQI combination is obtained.

Table 7 shows another design of a 10-bit PCI/CQI report for the PCI given in Table 4. In this design, one 5-bit CQI value is sent when one transport block is preferred. One 5-bit CQI value and one 4-bit CQI value are sent when two transport blocks are preferred, with the 5-bit CQI value being used for the better transport block. Since there are 448 possible values for two transport blocks, 64 out of 512 possible CQI combinations are not supported. The 64 CQI combinations that are least likely to occur may be eliminated.

TABLE 7

| Index | PCI/CQI Values | | | | | | | | | | Used For |
|---|---|---|---|---|---|---|---|---|---|---|---|
| 0 | 0 | 0 | 0 | 0 | 0 | 0 | 0 | 0 | 0 | 0 | 32 CQI levels for single transport block with precoding vector $w_0$ |
| ... | | | | | | | | | | | |
| 31 | 0 | 0 | 0 | 0 | 0 | 1 | 1 | 1 | 1 | 1 | |
| 32 | 0 | 0 | 0 | 0 | 1 | 0 | 0 | 0 | 0 | 0 | 32 CQI levels for single transport block with precoding vector $w_3$ |
| ... | | | | | | | | | | | |
| 63 | 0 | 0 | 0 | 0 | 1 | 1 | 1 | 1 | 1 | 1 | |
| 64 | 0 | 0 | 0 | 1 | 0 | 0 | 0 | 0 | 0 | 0 | 32 CQI levels for single transport block with precoding vector $w_2$ |
| ... | | | | | | | | | | | |
| 95 | 0 | 0 | 0 | 1 | 0 | 1 | 1 | 1 | 1 | 1 | |
| 96 | 0 | 0 | 0 | 1 | 1 | 0 | 0 | 0 | 0 | 0 | 32 CQI levels for single transport block with precoding vector $w_1$ |
| ... | | | | | | | | | | | |
| 127 | 0 | 0 | 0 | 1 | 1 | 1 | 1 | 1 | 1 | 1 | |
| 128 | 0 | 0 | 1 | 0 | 0 | 0 | 0 | 0 | 0 | 0 | 448 CQI combinations for two transport blocks with precoding matrix $W_1$ |
| ... | | | | | | | | | | | |
| 575 | 1 | 0 | 0 | 0 | 1 | 1 | 1 | 1 | 1 | 1 | |
| 576 | 1 | 0 | 0 | 1 | 0 | 0 | 0 | 0 | 0 | 0 | 448 CQI combinations for two transport blocks with precoding matrix $W_2$ |
| ... | | | | | | | | | | | |
| 1023 | 1 | 1 | 1 | 1 | 1 | 1 | 1 | 1 | 1 | 1 | |

Table 8 shows yet another design of a 10-bit PCI/CQI report for 2-bit PCI and 8-bit CQI and rank. In this design, a 2-bit PCI value may indicate one of four possible precoding vectors, e.g., as shown in Table 6 and equations (3) and (4). An 8-bit composite value may indicate the CQI and rank, e.g., as shown in Table 6.

TABLE 8

| Index | PCI Values | | CQI Values | | | | | | | | Used For |
|---|---|---|---|---|---|---|---|---|---|---|---|
| 0 | 0 | 0 | 0 | 0 | 0 | 0 | 0 | 0 | 0 | 0 | 31 CQI levels for single transport block with precoding vector $w_0$ |
| ... | | | | | | | | | | | |
| 30 | 0 | 0 | 0 | 0 | 0 | 1 | 1 | 1 | 1 | 0 | |
| 31 | 0 | 0 | 0 | 0 | 0 | 1 | 1 | 1 | 1 | 1 | 225 CQI combinations for two transport blocks with vectors $w_0$ and $w_3$ |
| ... | | | | | | | | | | | |
| 255 | 0 | 0 | 1 | 1 | 1 | 1 | 1 | 1 | 1 | 1 | |
| 256 | 0 | 1 | 0 | 0 | 0 | 0 | 0 | 0 | 0 | 0 | 31 CQI levels for single transport block with precoding vector $w_1$ |
| ... | | | | | | | | | | | |
| 286 | 0 | 1 | 0 | 0 | 0 | 1 | 1 | 1 | 1 | 0 | |
| 287 | 0 | 1 | 0 | 0 | 0 | 1 | 1 | 1 | 1 | 1 | 225 CQI combinations for two transport blocks with vectors $w_1$ and $w_2$ |
| ... | | | | | | | | | | | |
| 511 | 0 | 1 | 1 | 1 | 1 | 1 | 1 | 1 | 1 | 1 | |
| 512 | 1 | 0 | 0 | 0 | 0 | 0 | 0 | 0 | 0 | 0 | 31 CQI levels for single transport block with precoding vector $w_2$ |
| ... | | | | | | | | | | | |
| 542 | 1 | 0 | 0 | 0 | 0 | 1 | 1 | 1 | 1 | 0 | |
| 543 | 1 | 0 | 0 | 0 | 0 | 1 | 1 | 1 | 1 | 1 | 225 CQI combinations for two transport blocks with vectors $w_2$ and $w_1$ |
| ... | | | | | | | | | | | |
| 767 | 1 | 0 | 1 | 1 | 1 | 1 | 1 | 1 | 1 | 1 | |
| 768 | 1 | 1 | 0 | 0 | 0 | 0 | 0 | 0 | 0 | 0 | 31 CQI levels for single transport block with precoding vector $w_3$ |
| ... | | | | | | | | | | | |
| 798 | 1 | 1 | 0 | 0 | 0 | 1 | 1 | 1 | 1 | 0 | |

TABLE 8-continued

| Index | PCI Values | | | | | CQI Values | | | | | Used For |
|---|---|---|---|---|---|---|---|---|---|---|---|
| 799 | 1 | 1 | 0 | 0 | 0 | 1 | 1 | 1 | 1 | 1 | 225 CQI combinations for two transport blocks with vectors $w_3$ and $w_0$ |
| . | | | | | . | | | | | | |
| 1023 | 1 | 1 | 1 | 1 | 1 | 1 | 1 | 1 | 1 | 1 | |

In the design shown in Table 8, the 8-bit composite value has an overall range of 0 to 255, which may be partitioned into (i) a lower range of 0 to 30 for one transport block (or rank=1) and (ii) an upper range of 31 to 255 for two transport blocks (or rank=2). The upper range includes 225 values, which may be used to support 15 levels for each of two CQI values. If one transport block is preferred, then one CQI value within a range of 0 to 30 may be determined and provided as the 8-bit composite value. If two transport blocks are preferred, then one CQI value within a range of 0 to 14 may be determined for each transport block, and the two CQI values may be provided as the 8-bit composite value. The 8-bit composite value may be given as:

$$CQI_C = \begin{cases} CQI_S & \text{for one transport block} \\ 15 \times CQI_1 + CQI_2 + 31 & \text{for two transport blocks} \end{cases} \quad \text{Eq (5)}$$

where $CQI_S$ is a CQI value within $\{0 \ldots 30\}$ for one transport block, $CQI_1$ and $CQI_2$ are CQI values within $\{0 \ldots 14\}$ for two transport blocks, and $CQI_C$ is the 8-bit composite value for one or two transport blocks.

In general, the PCI, rank and CQI may be combined in various manners. Tables 6 to 8 give three examples in which the PCI, rank and CQI are combined into a 10-bit PCI/CQI report. The number of bits to use for the PCI/CQI report may be dependent on various factors such as the number of supported precoding matrices, the maximum number of transport blocks, the number of levels for the CQI value for each transport block, UE capability (e.g., SIC), etc. The PCI, rank and CQI may be mapped to a PCI/CQI report based on any mapping, with three example mappings shown in Tables 6 to 8.

The PCI, rank and CQI may be sent by the UE in various manners. Several schemes for sending the PCI, rank and CQI are described below.

Figure 5:
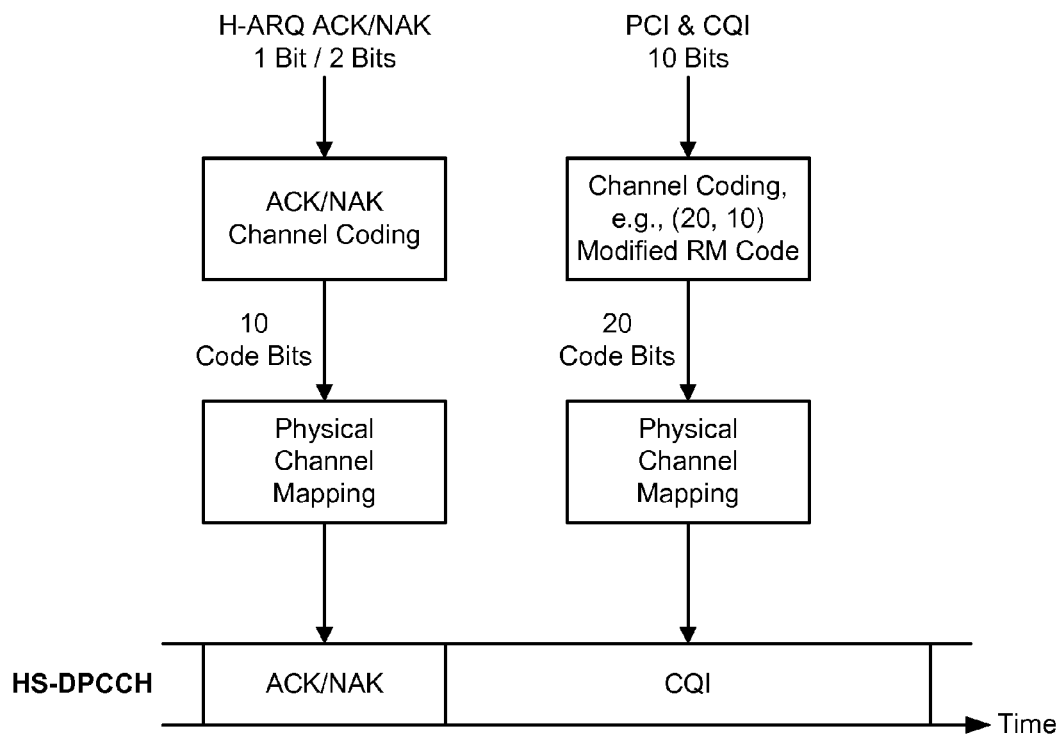
FIG. 5 shows a design of sending the PCI, rank and CQI on an HS-DPCCH.

FIG. 5 shows a design of sending the PCI, rank and CQI on the HS-DPCCH. In each TTI, ACK/NACK information may be sent in the first slot of the TTI, and the PCI, rank and CQI may be sent in the second and third slots of the TTI. In each TTI, one ACK/NACK bit for one transport block or two ACK/NACK bits for two transport blocks may be channel encoded to obtain 10 code bits. The 10 code bits for ACK/NACK may be spread and mapped to the first slot of the TTI.

In the design shown in FIG. 5, a PCI/CQI report may comprise ten composite PCI and CQI bits and may be generated, e.g., as shown in Table 6, 7 or 8. In another design, the PCI, rank and CQI may be sent separately, e.g., with three bits used for the PCI and rank, and seven bits used for the CQI. In any case, the ten bits for the PCI/CQI report may be channel encoded with a (20, 10) block code to obtain a codeword of 20 code bits. The (20, 10) block code may be a sub-code of a second order Reed-Muller code and may be defined in similar manner as a (20, 5) code used in 3GPP Release 6 for the CQI sent on the HS-DPCCH. The 20 code bits for the PCI/CQI report may be spread and mapped to the second and third slots of the TTI.

In general, a total of X bits may be sent on the HS-DPCCH for the PCI, rank and CQI, where X may be any integer value. The X bits may be for a combined PCI/CQI report, e.g., as shown in Table 6, 7 or 8. Alternatively, the X bits may include M bits for the PCI and N bits for the CQI and rank. A (20, X) block code may be used to encode the X total bits for the PCI, rank and CQI to obtain 20 code bits. For example, 12 total bits may be sent with a (20, 12) block code and may support 32 CQI levels for one transport block and 992 CQI combinations for two transport blocks based on the PCI/CQI mapping in Table 6. As another example, 11 total bits may be sent with a (20, 11) block code and may support (i) 32 CQI levels for each transport block based on the PCI/CQI mapping in Table 7 or (ii) 3 bits for PCI and rank and a 4-bit CQI value for each transport block with separate PCI/rank and CQI. The transmit power of the HS-DPCCH may be set to achieve the desired decoding performance for the X bits sent for the PCI, rank and CQI.

If BPSK is used for the HS-DPCCH, as defined in 3GPP Release 6, then 20 code bits may be sent in two slots. If QPSK is used for the HS-DPCCH, then 40 code bits may be sent in two slots. A (40, X) block code may then be used to encode X bits for PCI, rank and CQI into 40 code bits, which may be sent in two slots using QPSK. The use of QPSK for the HS-DPCCH may improve performance in some scenarios.

In general, a trade-off may be made between transmit power of the HS-DPCCH and granularity of the CQI. More transmit power may be used for the HS-DPCCH in order to achieve the same CQI granularity for both one and two transport blocks. If transmit power on the uplink is a concern, then the UE may be configured to send CQI reports at a slower rate, which may then result in slower link adaptation speed.

In another design, the PCI and rank are sent on the uplink DPCCH and the CQI is sent on the HS-DPCCH. Referring back to FIG. 3, the uplink DPCCH carries a pilot field, a transport format combination indicator (TFCI) field, a feedback information (FBI) field, and a transmit power control (TPC) field. The FBI field may be 0 or 1 bit in length. The FBI is originally defined to carry information on the selection of beamforming weights for CLTD. The FBI may be used to send the PCI and rank.

Figure 6:
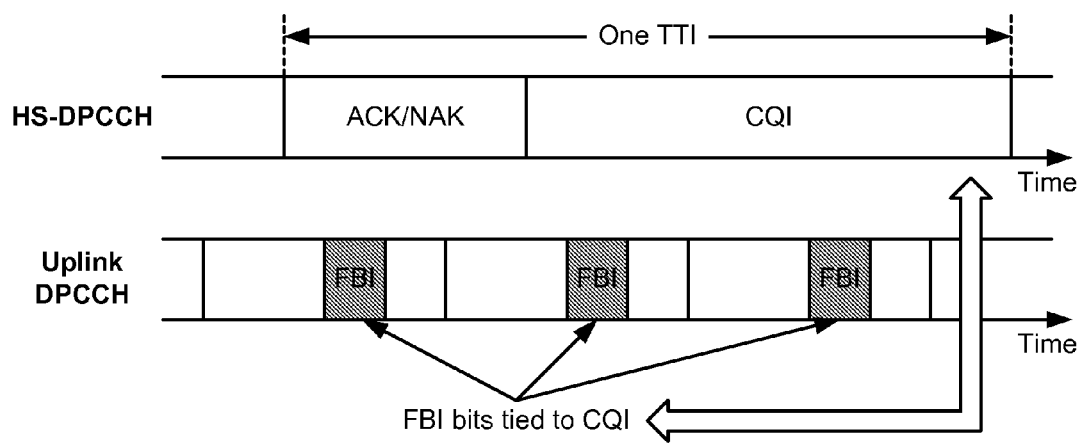
FIG. 6 shows a design of sending the PCI and rank on an uplink DPCCH.

FIG. 6 shows one design of sending the PCI and possibly the rank on the uplink DPCCH. The PCI and rank should be sent on the uplink DPCCH at approximately the same time that the associated CQI is sent on the HS-DPCCH. The HS-DPCCH may not be aligned with the uplink DPCCH at slot boundary. Nevertheless, a given TTI will cover one CQI transmission on the HS-DPCCH and three FBI bits in three slots on the uplink DPCCH.

In one design, the three FBI bits in one TTI are used to convey the selection of precoding matrix $W_1$ or $W_2$, as shown in Table 3. In this design, the three FBI bits may carry one information bit to indicate $W_1$ or $W_2$, and a (3,1) block code may be used for the information bit to improve reliability. For example, the information bit may be repeated three times and sent as three FBI bits. Information on whether one or two transport blocks are preferred (i.e., the rank), which column of the selected precoding matrix to use for one transport block, and how the CQI values are mapped to the different columns of the selected precoding matrix may be provided with the CQI sent on the HS-DPCCH.

In another design, the three FBI bits in one TTI are used to convey three PCI bits, which may be defined as shown in Table 4 or 5. The FBI bits may be sent at sufficient power level in order to achieve the desired reliability for the PCI bits.

Various designs for reporting the PCI, rank and CQI have been described above. To reduce impact to existing 3GPP Release 6, the PCI, rank and CQI may be combined into one X-bit PCI/CQI report, which may be encoded using a (20, X) block code and sent in two slots on the HS-DPCCH using BPSK. X may be equal to 10 for the designs shown in Tables 6, 7 and 8 and may be equal to other values for other designs.

Combining and sending the PCI, rank and CQI in one PCI/CQI report may provide certain advantages. First, the PCI, rank and CQI would be available together and may be used for scheduling decisions on data transmission. Second, combining the PCI, rank and CQI may allow a variable number of CQI values for a variable number of transport blocks to be sent in each TTI with the same X-bit report size. The same CQI reporting delay may also be achieved regardless of whether one or two transport blocks are preferred by the UE. Keep the reporting delay for CQI as small as possible may allow for better tracking of changes in the channel conditions.

Figure 7:
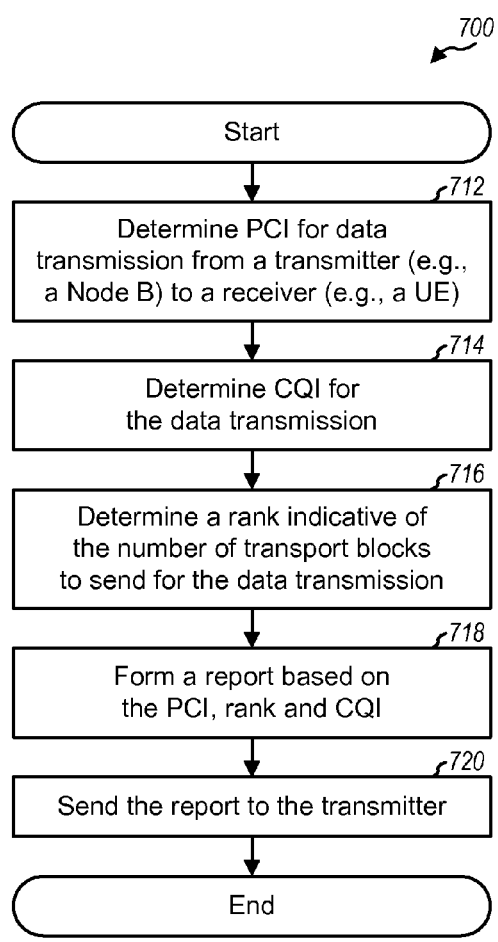
FIG. 7 shows a design of a process for sending feedback information.

FIG. 7 shows a design of a process 700 for sending feedback information. PCI for data transmission from a transmitter (e.g., a Node B) to a receiver (e.g., a UE) may be determined (block 712). CQI for the data transmission may also be determined (block 714). A rank indicative of the number of transport blocks to send in parallel for the data transmission may also be determined (block 716). The PCI, rank and CQI may be determined by evaluating different hypotheses and using the PCI, rank and CQI of the hypothesis with the best performance. A report may be formed based on the PCI, rank and CQI (block 718) and may be sent to the transmitter (block 720).

The PCI may comprise a precoding matrix or a precoding vector to use for the data transmission. The PCI may also comprise at least one precoding vector for at least one transport block to send (or preferred) for the data transmission, and additional precoding vector(s) for additional transport block (s), if sent, may be determined based on the at least one precoding vector conveyed by the PCI. For example, the PCI may comprise a primary precoding vector for a primary transport block. A secondary precoding vector for a secondary transport block, if sent, may be determined based on the primary precoding vector.

The CQI may comprise at least one CQI value for at least one transport block to send for the data transmission. The rank and CQI may be combined based on a mapping comprising multiple ranges of values, with each range of values corresponding to a different number of transport blocks. The CQI may comprise one CQI value and may be within a first range of values (e.g., from 0 to 30) if one transport block is preferred by the receiver. The CQI may comprise two CQI values and may be within a second range of values (e.g., from 31 to 255) if two transport blocks are preferred.

The PCI, rank and CQI may also be combined based on a mapping comprising a plurality of ranges of values corresponding to a plurality of values for the PCI. Each range of values may comprise multiple subranges of values corresponding to different numbers of transport blocks, e.g., as shown in Table 6. The plurality of ranges may comprise (i) at least two ranges of a first size (e.g., 32 CQI levels) corresponding to at least two PCI values for one transport block and (ii) at least one range of a second size (e.g., 448 CQI combinations) corresponding to at least one PCI value for multiple transport blocks, e.g., as shown in Table 7. The PCI, rank and CQI may also be combined in other manners or sent separately.

For block 720, the report may be encoded with a forward error correction (FEC) code to obtain a coded report, which may be sent on the HS-DPCCH. For example, the report may be encoded with a block code to obtain a codeword, which may be sent on the HS-DPCCH, as shown in FIG. 5. The PCI may also be sent on the uplink DPCCH, and the CQI and rank may be sent on the HS-DPCCH, e.g., as shown in FIG. 6.

Figure 8:
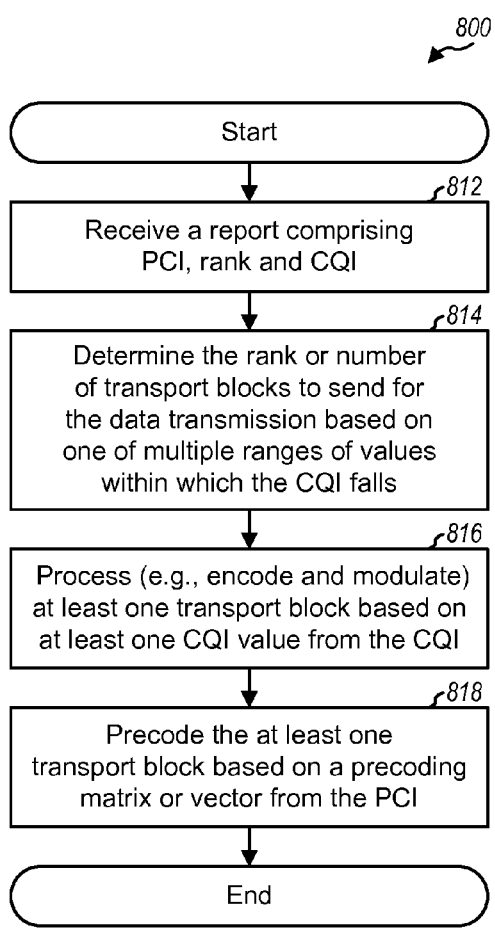
FIG. 8 shows a design of a process for sending data transmission.

FIG. 8 shows a design of a process 800 for sending data transmission. A report comprising PCI, rank and CQI may be received by a transmitter, e.g., a Node B (block 812). The number of transport blocks preferred for the data transmission may be determined based on one of multiple ranges of values within which the CQI falls (block 814). The multiple ranges may comprise first and second ranges. One CQI value for one transport block may be obtained if the CQI falls within the first range. Two CQI values for two transport blocks may be obtained if the CQI falls within the second range. At least one transport block may be processed based on the CQI (block 816). For example, each transport block may be processed based on a coding and modulation scheme determined by the CQI value for that transport block. The at least one transport block may be precoded based on the PCI (block 818). The PCI may comprise a precoding matrix or a precoding vector. The at least one transport block may then be precoded based on the precoding matrix or vector from the PCI. The PCI may also comprise a primary precoding vector, and a primary transport block may be precoded based on the primary precoding vector. If more than one transport block is sent, then a secondary transport block may be precoded based on a secondary precoding vector associated with the primary precoding vector.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:
at least one processor to determine precoding control indication (PCI) for data transmission from a transmitter to a receiver, to determine channel quality indication (CQI) for the data transmission, wherein a size and a number of CQI values of the CQI are variably related to a transmission rank, to form a single report based on the PCI and the CQI, and to send the report to the transmitter; and
a memory coupled to the at least one processor.

2. The apparatus of claim 1, wherein the at least one processor selects a precoding matrix or a precoding vector to use for the data transmission, and wherein the PCI comprises the selected precoding matrix or precoding vector.

3. The apparatus of claim 1, wherein the PCI comprises at least one precoding vector for at least one transport block to send for the data transmission, and wherein at least one additional precoding vector for at least one additional transport block is determined based on the at least one precoding vector from the PCI.

4. The apparatus of claim 1, wherein the PCI comprises a primary precoding vector for a primary transport block to send for the data transmission, and wherein a secondary precoding vector for a secondary transport block is determined based on the primary precoding vector.

5. The apparatus of claim 1, wherein the at least one processor determines at least one CQI value for at least one transport block to send for the data transmission, and wherein the CQI comprises the at least one CQI value.

6. The apparatus of claim 1, wherein the CQI comprises one CQI value and is within a first range of values when one transport block is preferred for the data transmission, and wherein the CQI comprises two CQI values and is within a second range of values when two transport blocks are preferred.

7. The apparatus of claim 6, wherein the CQI value for the one transport block has more levels than the two CQI values for the two transport blocks.

8. The apparatus of claim 6, wherein the CQI value for the one transport block has approximately five bits of resolution, and wherein each of the two CQI values for the two transport blocks has approximately four bits of resolution.

9. The apparatus of claim 6, wherein the second range comprises less than $2^{2L}$ values for two L-bit CQI values for the two transport blocks, where L is greater than one, and wherein for each combination of two L-bit CQI values that is not within the second range, the at least one processor reduces one L-bit CQI value such that a resultant combination of L-bit CQI values is within the second range.

10. The apparatus of claim 1, wherein the at least one processor determines a rank indicative of the number of transport blocks to send for the data transmission, and forms the report further based on the rank.

11. The apparatus of claim 10, wherein the at least one processor combines the rank and the CQI based on a mapping comprising multiple ranges of values, each range of values corresponding to a different number of transport blocks.

12. The apparatus of claim 10, wherein the at least one processor combines the rank and the CQI based on a mapping comprising first and second ranges of values, the first range of values covering one CQI value for one transport block, and the second range of values covering two CQI values for two transport blocks.

13. The apparatus of claim 10, wherein the at least one processor combines the PCI, the rank, and the CQI based on a mapping comprising a plurality of ranges of values corresponding to a plurality of values for the PCI.

14. The apparatus of claim 13, wherein each range of values comprises multiple subranges of values corresponding to different numbers of transport blocks.

15. The apparatus of claim 13, wherein the plurality of ranges comprise at least two ranges of a first size corresponding to at least two PCI values for one transport block and further comprise at least one range of a second size corresponding to at least one PCI value for multiple transport blocks.

16. The apparatus of claim 1, wherein the report comprises M bits for the PCI and N bits for the CQI, where M and N are integer values one or greater.

17. The apparatus of claim 1, wherein the at least one processor encodes the report with a forward error correction (FEC) code to obtain a coded report, and sends the coded report on a Dedicated Physical Control Channel for HS-DSCH (HS-DPCCH).

18. The apparatus of claim 1, wherein the at least one processor encodes the report with a block code to obtain a codeword and sends the codeword on a Dedicated Physical Control Channel for HS-DSCH (HS-DPCCH).

19. The apparatus of claim 1, wherein the at least one processor sends the PCI on an uplink Dedicated Physical Control Channel (DPCCH) and sends the CQI on a Dedicated Physical Control Channel for HS-DSCH (HS-DPCCH).

20. The apparatus of claim 1, wherein the transmitter is a Node B and the receiver is a user equipment (UE).

21. A method comprising:
  determining precoding control indication (PCI) for data transmission from a transmitter to a receiver;
  determining channel quality indication (CQI) for the data transmission, wherein a size and a number of CQI values of the CQI are variably related to a transmission rank;
  forming a single report based on the PCI and the CQI; and
  sending the report to the transmitter.

22. The method of claim 21, wherein the determining the PCI comprises
  selecting a precoding matrix or a precoding vector to use for the data transmission, and
  forming the PCI to comprise the selected precoding matrix or precoding vector.

23. The method of claim 21, wherein the determining the PCI comprises:
  determining a primary precoding vector for a primary transport block to send for the data transmission, and
  forming the PCI to comprise the primary precoding vector, and wherein a secondary preceding vector for a secondary transport block is determined based on the primary preceding vector.

24. The method of claim 21, wherein the determining the CQI comprises
  determining at least one CQI value for at least one transport block to send for the data transmission, and
  forming the CQI to comprise the at least one CQI value.

25. The method of claim 21, wherein the determining the CQI comprises
  determining one CQI value for one transport block when one transport block is preferred for the data transmission,
  determining two CQI values for two transport blocks when two transport blocks are preferred for the data transmission, and
  forming the CQI to comprise the one CQI value for the one transport block or the two CQI values for the two transport blocks, the CQI being within a first range of values for one CQI value and within a second range of values for two CQI values.

26. The method of claim 21, further comprising:
  determining a rank indicative of the number of transport blocks to send for the data transmission; and
  combining the rank and the CQI based on a mapping comprising multiple ranges of values, each range of values corresponding to a different number of transport blocks, and wherein the report is formed based on the combined rank and CQI.

27. The method of claim 21, further comprising:
  encoding the report with a forward error correction (FEC) code to obtain a coded report; and
  sending the coded report on a Dedicated Physical Control Channel for HS-DSCH (HS-DPCCH).

28. The method of claim 21, further comprising:
  encoding the report with a block code to obtain a codeword; and
  sending the codeword on a Dedicated Physical Control Channel for HS-DSCH (HS-DPCCH).

29. An apparatus comprising:
  means for determining precoding control indication (PCI) for data transmission from a transmitter to a receiver;
  means for determining channel quality indication (CQI) for the data transmission, wherein a size and a number of CQI values of the CQI are variably related to a transmission rank;
  means for forming a single report based on the PCI and the CQI; and
  means for sending the report to the transmitter.

30. The apparatus of claim 29, wherein the means for determining the PCI comprises
  means for selecting a precoding matrix or a precoding vector to use for the data transmission, and
  means for forming the PCI to comprise the selected precoding matrix or precoding vector.

31. The apparatus of claim 29, wherein the means for determining the CQI comprises
  means for determining at least one CQI value for at least one transport block to send for the data transmission, and
  means for forming the CQI to comprise the at least one CQI value.

32. The apparatus of claim 29, wherein the means for determining the CQI comprises
  means for determining one CQI value for one transport block when one transport block is preferred for the data transmission,
  means for determining two CQI values for two transport blocks when two transport blocks are preferred for the data transmission, and
  means for forming the CQI to comprise the one CQI value for the one transport block or the two CQI values for the two transport blocks, the CQI being within a first range of values for one CQI value and within a second range of values for two CQI values.

33. The apparatus of claim 29, further comprising:
  means for encoding the report with a forward error correction (FEC) code to obtain a coded report; and
  means for sending the coded report on a Dedicated Physical Control Channel for HS-DSCH (HS-DPCCH).

34. The apparatus of claim 29, further comprising:
  means for encoding the report with a block code to obtain a codeword; and
  means for sending the codeword on a Dedicated Physical Control Channel for HS-DSCH (HS-DPCCH).

35. A non-transitory computer-readable medium storing a computer program, wherein execution of the computer program is for:
  causing a computer to determine precoding control indication (PCI) for data transmission from a transmitter to a receiver;
  causing a computer to determine channel quality indication (CQI) for the data transmission, wherein a size and a number of CQI values of the CQI are variably related to a transmission rank;
  causing a computer to form a single report based on the PCI and the CQI; and
  causing a computer to send the report to the transmitter.

36. The non-transitory computer-readable medium of claim 35, wherein execution of the computer program is also for:
  selecting a precoding matrix or a precoding vector to use for the data transmission, and
  forming the PCI to comprise the selected precoding matrix or precoding vector.

37. The non-transitory computer-readable medium of claim 35, wherein execution of the computer program is also for:
  determining at least one CQI value for at least one transport block to send for the data transmission, and
  forming the CQI to comprise the at least one CQI value.

38. The non-transitory computer-readable medium of claim 35, wherein execution of the computer program is also for:

determining one CQI value for one transport block if one transport block is preferred for the data transmission, determining two CQI values for two transport blocks if two transport blocks are preferred for the data transmission, and forming the CQI to comprise the one CQI value for the one transport block or the two CQI values for the two transport blocks, the CQI being within a first range of values for one CQI value and within a second range of values for two CQI values.

39. An apparatus comprising:

at least one processor to receive a single report comprising precoding control indication (PCI) and channel quality indication (CQI), wherein a size and a number of CQI values of the CQI are variably related to a transmission rank, to process at least one transport block based on the CQI, and to precode the at least one transport block based on the PCI; and a memory coupled to the at least one processor.

40. The apparatus of claim 39, wherein the at least one processor determines one of multiple ranges of values within which the CQI falls, and determines the number of transport blocks preferred by a receiver based on the determined range of value for the CQI.

41. The apparatus of claim 39, wherein the at least one processor obtains one CQI value for one transport block when the CQI falls within a first range of values, and obtains two CQI values for two transport blocks when the CQI falls within a second range of values.

42. The apparatus of claim 39, wherein the at least one processor obtains at least one CQI value for the at least one transport block based on the CQI, and processes each transport block based on a coding and modulation scheme determined by a CQI value for the transport block.

43. The apparatus of claim 39, wherein the at least one processor determines a precoding matrix or a precoding vector for the at least one transport block based on the PCI, and precodes the at least one transport block based on the precoding matrix or the precoding vector.

44. The apparatus of claim 39, wherein the at least one processor obtains a primary precoding vector based on the PCI, precodes a primary transport block based on the primary precoding vector, and precodes a secondary transport block based on a secondary precoding vector associated with the primary precoding vector.

45. A method comprising:

receiving a single report comprising precoding control indication (PCI) and channel quality indication (CQI), wherein a size and a number of CQI values of the CQI are variably related to a transmission rank;

processing at least one transport block based on the CQI; and precoding the at least one transport block based on the PCI.

46. The method of claim 45, further comprising:

determining one of multiple ranges of values within which the CQI falls; and determining the number of transport blocks preferred by a receiver based on the determined range of value for the CQI.

47. The method of claim 45, wherein the processing the at least one transport block based on the CQI comprises obtaining one CQI value for one transport block when the CQI falls within a first range of value, obtaining two CQI values for two transport blocks when the CQI falls within a second range of values, and processing each transport block based on a coding and modulation scheme determined by a CQI value for the transport block.

48. The method of claim 45, wherein the precoding the at least one transport block based on the PCI comprises determining a precoding matrix or a precoding vector for the at least one transport block based on the PCI, and precoding the at least one transport block based on the precoding matrix or the precoding vector.

49. The method of claim 45, wherein the precoding the at least one transport block based on the PCI comprises determining a primary precoding vector based on the PCI, precoding a primary transport block based on the primary precoding vector, and precoding a secondary transport block based on a secondary precoding vector associated with the primary precoding vector.

50. An apparatus comprising:

means for receiving a single report comprising precoding control indication (PCI) and channel quality indication (CQI), wherein a size and a number of CQI values of the CQI are variably related to a transmission rank;

means for processing at least one transport block based on the CQI; and means for precoding the at least one transport block based on the PCI.

51. The apparatus of claim 50, further comprising:

means for determining one of multiple ranges of values within which the CQI falls; and means for determining the number of transport blocks preferred by a receiver based on the determined range of value for the CQI.

52. The apparatus of claim 50, wherein the means for processing the at least one transport block based on the CQI comprises means for obtaining one CQI value for one transport block when the CQI falls within a first range of value, means for obtaining two CQI values for two transport blocks when the CQI falls within a second range of values, and means for processing each transport block based on a coding and modulation scheme determined by a CQI value for the transport block.

53. The apparatus of claim 50, wherein the means for precoding the at least one transport block based on the PCI comprises means for determining a precoding matrix or a precoding vector for the at least one transport block based on the PCI, and means for precoding the at least one transport block based on the precoding matrix or the precoding vector.

54. The apparatus of claim 50, wherein the means for precoding the at least one transport block based on the PCI comprises means for determining a primary precoding vector based on the PCI, means for precoding a primary transport block based on the primary precoding vector, and means for precoding a secondary transport block based on a secondary precoding vector associated with the primary precoding vector.

55. A non-transitory computer-readable medium storing a computer program, wherein execution of the computer program is for:

causing a computer to receive a single report comprising precoding control indication (PCI) and channel quality indication (CQI), wherein a size and a number of CQI values of the CQI are variably related to a transmission rank;

causing a computer to process at least one transport block based on the CQI; and causing a computer to precode the at least one transport block based on the PCI.

* * * * *

UNITED STATES PATENT AND TRADEMARK OFFICE
CERTIFICATE OF CORRECTION

PATENT NO. : 8,699,587 B2  
APPLICATION NO. : 11/841549  
DATED : April 15, 2014  
INVENTOR(S) : Josef Blanz et al.

Page 1 of 1

It is certified that error appears in the above-identified patent and that said Letters Patent is hereby corrected as shown below:

In the Claims

In column 21, line 20, in Claim 23, delete "preceding," and insert -- precoding --, therefor.

In column 21, line 22, in Claim 23, delete "preceding" and insert -- precoding --, therefor.

Signed and Sealed this  
Twenty-third Day of June, 2015

Michelle K. Lee  
*Director of the United States Patent and Trademark Office*